United States Patent
Adams

[15] 3,647,178
[45] Mar. 7, 1972

[54] HIGH-PRESSURE LOW-TORQUE VALVE ASSEMBLY
[72] Inventor: Ladd M. Adams, Norman, Okla.
[73] Assignee: Balon Corporation, Oklahoma City, Okla.
[22] Filed: Sept. 24, 1970
[21] Appl. No.: 74,956

[52] U.S. Cl.....................251/148, 251/159, 251/174, 251/315
[51] Int. Cl..............................................F16k 1/16
[58] Field of Search.............251/148, 159, 160, 174, 175, 251/172

[56] References Cited

UNITED STATES PATENTS

| | | |
|---|---|---|
| 2,370,751 | 3/1945 | Prager.................................251/159 |
| 2,796,230 | 6/1957 | Grove..................................251/172 |
| 3,266,525 | 8/1966 | Wolter.................................251/174 |
| 3,565,392 | 2/1971 | Bryant.................................251/159 |
| 3,343,562 | 9/1967 | Combes...........................251/175 X |

*Primary Examiner*—Harold W. Weakley
*Attorney*—Dunlap, Laney, Hessin & Dougherty

[57] ABSTRACT

A valve assembly of the type wherein the valve seats are moved away from the valve member by fluid pressure, particularly when the valve is being opened, wherein the fluid pressure so employed is controlled by the handle of the valve operating a control valve.

31 Claims, 2 Drawing Figures

PATENTED MAR 7 1972 3,647,178

INVENTOR
LADD M. ADAMS

BY
Dunlap, Laney, Hessin & Dougherty
ATTORNEYS 3,647,178

HIGH-PRESSURE LOW-TORQUE VALVE ASSEMBLY

BACKGROUND OF THE INVENTION

1. Field of the Invention

This invention relates generally to improvements in valve assemblies and, more particularly, but not by way of limitation, to a valve assembly adapted to move the seats therein to a nonseating position prior to the opening or closing of the valve assembly.

2. Description of the Prior Art

In the past, there have been various valve assemblies having seats which were slidingly disposed in the valve body. Some of the valve assemblies incorporated external control apparatus adapted to move the seats in the valve assembly to a nonseating position upon actuation thereof. This latter type of valve assembly was particularly useful in some applications. However, the complicated, external control apparatus generally required or dictated that the valve assembly be installed in the field in a location having sufficient free space to accommodate the external control elements thereby limiting the utilization of such valve assemblies.

The utilization of external control apparatus, that is "external" with respect to the valve assembly, also required an additional operator-step in opening the valve assembly. More particularly, the operator was required to direct his attention first to the external control apparatus to move the seat to a nonseating position, and then to the valve assembly apparatus to open the valve assembly. In many instances, the operator in the field would not be aware of the existence or the purpose of the external control apparatus, and would thus attempt to open or close the valve assembly without first moving the seats to a nonseating position. The result of opening or closing the valve assembly in this manner was that an additional frictional resistance was imposed upon the valve member, thereby increasing the torque required to open or close the valve assembly and increasing the frictional, destructive resistance or contact between the valve member and the seat assemblies per se.

The utilization of valve assemblies in high pressure application has increased in recent years, and the pressure level of the fluid being controlled has also increased. Particularly in these high pressure applications, it is desirable to have a valve assembly adapted to quickly, easily and efficiently move the seats to a nonseating position prior to the opening or closing of the valve assembly.

SUMMARY OF THE INVENTION

An object of the invention is to provide a valve assembly adapted to move the seat assemblies to a nonseating position with respect to the valve member prior to the opening or closing of the valve assembly.

A further object of the invention is to provide a valve assembly wherein the operation thereof requires less operator skill and attention.

Another object of the invention is to provide a valve assembly wherein the seats are moved to a nonseating position prior to the opening or closing of the valve assembly in a more efficient manner.

An additional object of the invention is to provide a valve assembly which is economical in construction and operation.

A still further object of the invention is to provide a valve assembly having a reduced torque requirement to open or close the valve assembly.

A further object of the invention is to reduce the frictional resistance between the valve member and the seat assemblies during the rotation of the valve member to an open position.

A yet further object of the invention is to provide a valve assembly utilizing an elastomeric seal member, which is protected from the throttling flow of the fluid through the valve assembly.

Another object of the invention is to provide a valve assembly having a reduced corrosion effect and particle buildup between the valve seats and the valve member.

An additional object of the invention is to provide a valve assembly for high pressure applications wherein the size requirements of a control valve actuator therefor are reduced.

A yet further object of the invention is to provide a valve assembly wherein the large sizes of the valve assembly may be controlled utilizing smaller control valve actuators.

Other objects and advantages of the invention will be evident from the following detailed description when read in conjunction with the accompanying drawings which illustrate the various embodiments of the invention.

DESCRIPTION OF THE PREFERRED EMBODIMENTS

Figure 1:
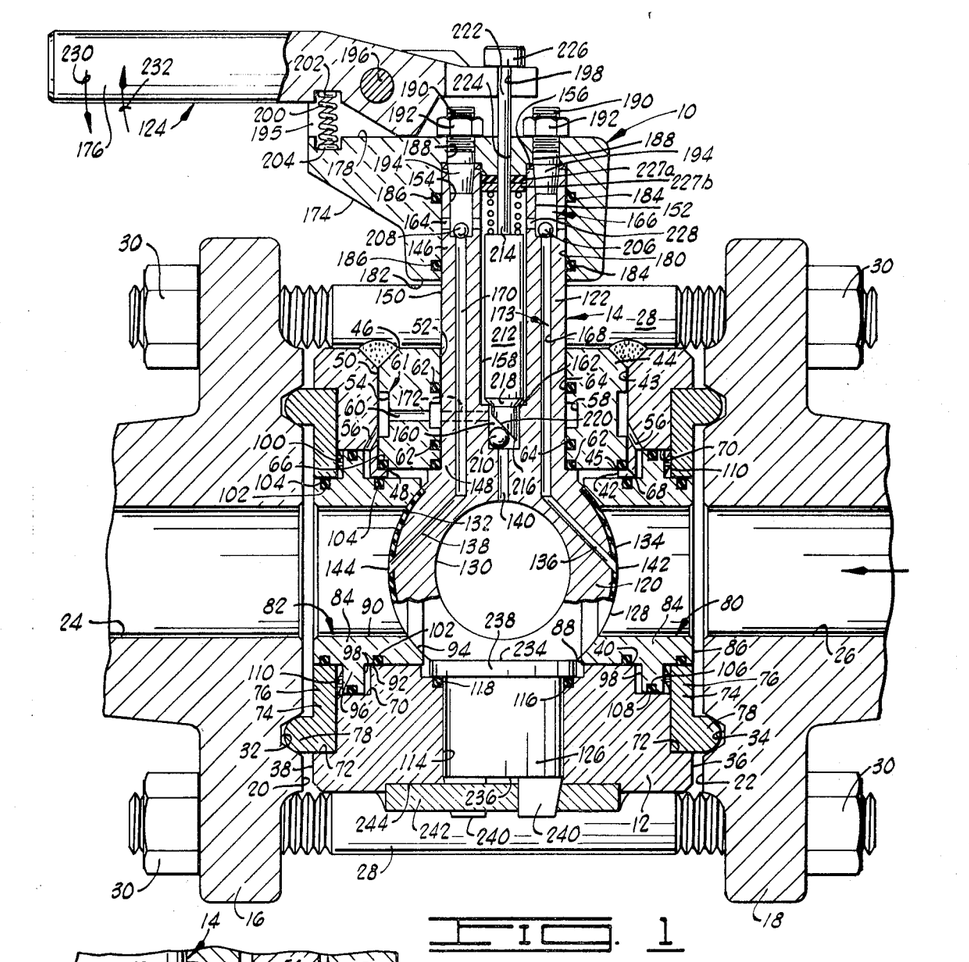
FIG. 1 is a cross-sectional view of a valve assembly constructed in accordance with the invention.

Referring to the drawings in detail, and to FIG. 1 in particular, shown therein and designated by the general reference character 10 is a valve assembly basically comprising a valve body 12, having a valve member assembly 14 supported thereby. The valve assembly 10 is adapted for controlling the flow of fluid therethrough, and is disposed generally between a pair of flanges 16 and 18.

Each of the flanges 16 and 18 includes an end face 20 or 22, respectively, and an opening 24 or 26 extending axially therethrough. The openings 24 and 26 are axially aligned, and the end of each flange 16 and 18 opposite the end face 20 or 22 thereof, is adapted to be connected to a conduit (not shown) in a suitable manner, such as by threading or welding thereto.

The valve body 12 is held in an assembled relationship between the flanges 16 and 18 by a plurality of threaded bolts 28, each of which extends through the flanges 16 and 18 and about the valve body 12. Each of the bolts 28 is provided with a pair of threaded nuts 30 that engage the flanges 16 and 18.

An annular ring groove 32 is formed in a portion of the end face 20 of the flange 16, and an annular ring groove 34 is formed in a portion of the end face 22 of the flange 18. As shown in FIG. 1, each annular groove 32 and 34 forms a pair of annular walls in the respective end face 20 or 22. The annular walls formed by each ring groove 32 and 34 are tapered inwardly, for reasons which will be made more apparent below.

The valve body 12 is basically tubularly shaped and has opposite end faces 36 and 38 and a bore 40 extending therethrough, intersecting the opposite end faces 36 and 38. Although the valve assembly 10, as shown in FIG. 1, is bidirectional, that is the valve assembly 10 is adapted such that the fluid flow therethrough can be in either direction through the bore 40, for the purpose of clarity of description the end face 36 will be referred to below as the upstream end face 36 of the valve body 12 and the end face 28 will be referred to sometimes below as the downstream end face 38 of the valve body 12.

An aperture 42 is formed in an upper portion of the valve body 12 and extends transversely therethrough, intersecting a portion of the bore 40. A counterbore 43 is formed in the valve body 12, generally adjacent the aperture 42, thereby providing an upwardly facing land 45 in the valve body 12. The wall formed by the counterbore 43 is shaped and disposed to matingly receive a stem-engaging element 44, in a manner to be more fully described below.

In a preferred form, the stem-engaging element 44 is cylindrically shaped and, as shown in FIG. 1, the stem-engaging element 44 has opposite ends 46 and 48 and an outer periphery 50. The outer periphery 50 is sized to matingly engage the wall formed by the counterbore 43 in the valve body 12.

The stem-engaging element 44 is disposed in the counterbore 43 to a position wherein the end 48 thereof engages the upwardly facing surface 45 formed in the valve body 12. The upwardly facing surface 45 in the valve body 12 therefore cooperates to locate the stem-engaging element 44 in an assembled position.

As shown in FIG. 1, the stem-engaging element is, in a preferred form, welded in place in the counterbore 43. The stem-engaging element 44 therefore becomes essentially an integral part of the valve body 12 and thus the various apertures, openings, and grooves in the stem-engaging element 44 will sometimes be referred to below as being formed in the valve body 12. The salient reason for constructing the stem-engaging element 44 as a separate component with respect to the valve body 12 is so that the various apertures, openings and grooves in the stem-engaging element 44 can be formed therein in the manufacture of the valve assembly 10 in a more economical manner.

The valve body 12 includes a stem aperture 52 which extends transversely through a portion of the valve body 12, and more particularly through a central portion of the stem-engaging element 44, intersecting a portion of the bore 40 through the valve body 12. The stem aperture 52 is sized to journally receive a portion of a valve stem of the valve member assembly 14, in a manner to be more fully described below.

An annular seat opening 54 is formed in the valve body 12, or more particularly an annular groove is formed in a portion of the outer periphery 50 of the stem-engaging element 44. The annular groove is disposed such that when the stem-engaging element 44 is secured in position in the valve body 12, the annular groove cooperates with the wall formed by the counterbore 43 of the valve body 12 to form the annular seat opening 54 in the valve body 12.

An annular, angular opening 56 is formed in a portion of the valve body 12, generally adjacent the bore 40 therethrough. The opening 56 is disposed such that one end thereof intersects the seat opening 54 and the opposite end thereof intersects the bore 40 through the valve body 12. A portion of the seat opening 54 is therefore placed in communication with a portion of the bore 40 in the valve body 12, for reasons which will be made more apparent below.

An annular groove 58 is formed in a central portion of the wall formed by the stem aperture 52. As shown in FIG. 1, a transverse aperture 60 is formed in a portion of the valve body 12. The transverse aperture 60 intersects the groove 58 and the seat opening 54 in the valve body 12. A portion of the seat opening 54 is therefore in communication with a portion of the stem aperture 52 in the valve body 12.

The seat opening 54, the opening 56, the groove 58, and the transverse aperture 60 provide what is sometimes referred to below as a valve body control passageway 61 in the valve body 12. The valve body control passageway 61 is shaped and disposed such that a portion of the valve body 12 formed by the stem aperture 52 communicates with a portion of the bore 40 in the valve body 12 via the valve body control passage 61. The valve body passageway 61 is further adapted and disposed to provide a passageway for fluid to flow through the valve body 12, for reasons and in a manner to be more fully described below.

A plurality of annular grooves 62 are formed in the wall of the valve body 12 formed by the stem aperture 52 therethrough. As shown in FIG. 1, one of the annular grooves 62 is disposed in the stem aperture 52 generally above the groove 58 and the remaining apertures 62 are disposed in the stem aperture 52 generally below the annular groove 58. It should also be noted that one of the annular grooves 62 disposed below the groove 58 intersects the end 48 of the stem engaging element 44, for reasons which will become apparent below.

An elastomeric seal member 64 is disposed in each of the annular grooves 62. Each elastomeric seal member 64 is sized and disposed to sealingly engage a portion of an upper valve stem of the valve member assembly 14, thereby forming a fluidtight seal between the upper valve stem and the valve body 12, in a manner to be made more apparent below. It should also be noted, in one form, that each elastomeric seal member may be bonded in the respective annular groove 62 or, in another form, the seal members 64 may be constructed of an asbestos type material, which may be particularly preferable in high temperature applications of the valve assembly 10.

An annular groove 66 is formed in the end 48 of the stem engaging element 44. The annular groove 66 is disposed such that a portion thereof intersects the end 48 of the stem-engaging element 44 and another portion thereof intersects the outer periphery 50 of the stem engaging element 44. An elastomeric seal member 68 is disposed in the annular groove 66 and, in one form, the elastomeric seal member may be bonded in the groove 66. The elastomeric seal member 68 is sized and disposed to sealingly engage the valve body 12, generally adjacent the upwardly facing surface 45 formed therein, thereby forming a fluidtight seal between the valve body and element 44.

A pair of counterbores 70 and 72 are formed in the upstream end face 36 and the downstream end face 38 of the valve body 12. As shown in FIG. 1, each counterbore 72 is disposed generally adjacent and intersecting the adjacent counterbore 70, and each counterbore 72 has a larger diameter than the adjacent counterbore 70, for reasons to be made apparent below.

An annular L-shaped flange seat 74 is disposed in each counterbore 72 of the valve body 12. In a preferred form, and as shown in FIG. 1, each flange seat 74 is constructed similarly, and each flange seat 74 includes leg portions 76 and 78. The leg portion 76 of each flange seat 74 is sized such that in the assembled position, shown in FIG. 1, a portion of each leg portion 76 extends radially inward of the annular wall formed in the valve body by the counterbores 70 formed therein. The inner periphery formed by each leg portion 76 is sized and disposed to provide sliding support for the upstream or the downstream seat assembly, in a manner to be made more apparent below.

As shown in FIG. 1, the outermost portion of the leg portion 78 of each flange seat 74 is formed on a curvature. The curvature of each leg portion 78 is sized to seatingly and sealingly engage the annular walls formed by one of the ring grooves 32 or 34, such that in an assembled position, as shown in FIG. 1, each flange seat 74 cooperates to provide a metal-to-metal sealing integrity between one of the flanges 16 or 18 and the valve body 12. The tapered walls of the ring grooves 32 and 34 are thus adapted to increasingly provide a sealing contact with each leg portion 78 as the flanges 16 and 18 are secured about the valve assembly 10.

As shown in FIG. 1, each flange seat 74 is sized such that in the assembled position of the valve assembly 10 there is a gap between the end 36 of the valve body 12 and the end 22 of the flange 18, and between the end 38 of the valve body 12 and the end 20 of the flange 16. The gaps, referred to above, are particularly sized and adapted to accommodate a portion of the seat assemblies in the valve body 12 as the seat assemblies are slid to a nonseating position in the valve body 12, as will be described below.

An upstream seat assembly 80 is slideably disposed in a portion of the bore 40 of the valve body 12, generally near the upstream end 36 thereof. A downstream seat assembly 82 is slideably disposed in a portion of the bore 40 of the valve body 12, generally near the downstream end portion 38 thereof.

In the preferred form and as shown in FIG. 1, each seat assembly 80 and 82 is constructed similar, and each seat assembly 80 and 82 includes an annular seat ring 84, having a nonvalve member end 86, a valve member end 88, an inner periphery 90 and an outer periphery 92. A seating surface 94 is formed on a portion of the valve member end 88 of each seat ring 94. Each seating surface 94 is sized and disposed to seatingly and sealingly engage a portion of a valve member when the seat assembly 80 or 82 has been moved or slid to a seating position in the value body 12, in a manner as will be more fully described below. In a preferred form, the portion of each seat ring 84 forming the seating surface 94 is constructed of a metal or reinforced plastic, for reasons to be made more apparent below.

As shown in FIG. 1, each seat ring 84 has an annular rib 96 formed on a portion of the outer periphery 92 thereof, and extending generally perpendicularly therefrom. The outer periphery of each annular rib is sized to slidingly fit in one of the counterbores 70 in the valve body 12.

Each annular rib 96 forms a piston surface 98 which extends annularly about each seat ring 84, generally facing the valve member. Each seat ring 84 is disposed in the valve body 12 such that each piston surface 98 is in communication with the valve body control passageway 61 via the opening 56 in the valve body 12. Each seat ring 84 is disposed in the valve body 12 such that fluid from the valve body control passageway 61 will act upon the respective piston surface 98 to bias each seat assembly 80 and 82 toward a nonseating position in the valve body 12, in a manner to be more fully described below.

Each annular rib 96 also forms a biasing surface 100 which faces generally in an opposite direction with respect to the piston surface 98 of each respective seat ring 84. The purpose and function of each biasing surface 100 will be described in greater detail below.

As shown in FIG. 1, the outer periphery 92 of each seat ring 84 is sized to slidingly engage a portion of the wall formed in the valve body 12 by the bore 40 and to slidingly engage a portion of the inner periphery of one of the flange rings 74. In the assembled position, as shown in FIG. 1, the outer periphery formed by each annular rib 96 is also in sliding engagement with the wall formed by one of the counterbores 70 of the valve body 12. It is apparent from the foregoing that each seat ring 84 is therefore disposed and shaped such that it can be slid axially in the valve body 12 generally toward the upstream end 36 or the downstream end 38 of the valve body 12, in a manner and for reasons which will be described in greater detail below.

A pair of annular grooves 102 are formed in a portion of the outer periphery 92 of each seat ring 84. As shown in FIG. 1, one of the grooves 102 is disposed on each side of the annular rib 96 of each seat ring 84. An elastomeric seal member 104 is disposed in each annular groove 102 and, in one form, each elastomeric seal member 104 may be bonded in one of the grooves 102.

One of the seal members 104 is sized to slidingly and sealingly engage a portion of the wall formed by the bore 40 in the valve body 12, thereby providing a fluidtight seal between each seat ring 84 and the valve body 12. The other seal member 104 is sized to slidingly and sealingly engage the inner periphery formed by the leg portion 76 of each flange ring 74, thereby providing a fluidtight seal between each seat ring 84 and one of the flange rings 74.

An annular groove 106 is formed in a portion of the outer periphery of each annular rib 96, and an elastomeric seal member 108 is disposed in each annular groove 106. In one form, each elastomeric seal member can be bonded in one of the annular grooves 106. EAch elastomeric seal member 108 is sized to slidingly and sealingly engage a portion of the valve body 12 formed by one of the counterbores 70 therein, thereby providing a fluidtight seal therebetween. It is apparent from the foregoing that the seal members 104 and 108 cooperate with each seat assembly 80 and 82 to seal the end of the valve body control passageway 61 at the valve body bore 40.

A Belleville spring 110 is disposed or anchored in a portion of each counterbore 70 in the valve body 12. Each spring 110 is sized to biasingly engage the biasing surface 100 of one of the seat rings 84 and to biasingly engage a portion of one of the leg portions 76 of each flange seat 74. Each spring 110 is shaped and disposed to bias one of the seat assemblies 80 or 82 in a direction generally toward a seating position with respect to the valve member of the valve assembly 10, as will be described in greater detail below.

An aperture 114 is formed in the valve body 12 and, as shown in FIG. 1, the aperture 114 is radially aligned with the stem aperture 52 in the valve body 12, for reasons which will be made apparent below. A counterbore 116 is formed in a portion of the aperture 114 and a portion of the bore 40 through the valve body 12.

A seal member 118 is disposed in the counterbore 116 and, in one form, the seal member 118 can be bonded in counterbore 116. The seal member 118 is sized to sealingly engage a portion of a lower valve stem, in a manner to be more fully described below.

The valve member assembly 14 is supported by the valve body 12 and basically includes; a spherically shaped valve member 120, an upper valve stem 122, a handle actuator 124 and a lower valve stem 126. The valve member assembly 14 is adapted to cooperate in the valve assembly 10 such that each seat assembly 80 and 82 is moved to a nonseating position with respect to the valve member 120 prior to turning the valve member 120 to an open or closed position.

The valve member 120 is movably disposed in a portion of the bore 40 of the valve body 12, generally between the upstream end 36 and the downstream end 38 thereof. The valve member 120 has an outer surface 128 shaped to seatingly and sealingly engage the seating surfaces 94 of the upstream seat assembly 80 or the downstream seat assembly 82, when the upstream or the downstream seat assembly 80 or 82 is in a seating position in the valve body 12.

A flow port 130 is formed through a central portion of the valve member 120 and is disposed such that in the open position of the valve member 120 the flow port 130 is axially aligned with the bore 40 and the valve body 12 and such that in the closed position of the valve member 120, as shown in FIG. 1, the flow port 130 extends generally at a right angle with respect to the bore 40 in the valve body 12.

A recess 132 is formed about a portion of the outer surface 128 of valve member 120. In one form and as shown in FIG. 1, an elastomeric seal member 134 is bonded in the recess 132. The elastomeric seal member 134 is disposed in the valve member 120 such that a portion of the seal member 134 sealingly engages a portion of the seating surface 94 of the upstream seat assembly 80 and the downstream seat assembly 82, when such seat assembly has been moved to a seating position in the valve body 12.

The valve member 120 has an upstream aperture 136, a downstream aperture 138 and a central aperture 140 formed in a portion thereof. As shown in FIG. 1, a portion of the upstream aperture 136 intersects a portion of the outer surface 128 of the valve member 120, thereby forming what may be referred to as an upstream opening 142 in the valve member 120. The opening 142 is referred to above and below as an upstream opening 142, since when the valve member 120 has been rotated to the closed position, shown in FIG. 1, the upstream aperture 136 is in communication with the upstream end portion of the valve body 12 via the upstream opening 142 in the valve member 120.

The upstream aperture 136 is sometimes referred to below as the upstream valve member control passageway 136. The upstream valve member control passageway 136 is shaped and disposed such that a portion of the fluid in the upstream end of the valve body 12 communicates with the upstream valve member control passageway 136, in the closed position of the valve member 120.

As shown in FIG. 1, a portion of the downstream aperture 138 intersects a portion of the outer surface 128 of the valve member 120, thereby forming what may be referred to as a downstream opening 144 in the valve member 120. The opening 144 is referred to above and below as a downstream opening 144, since when the valve member 120 has been rotated to the closed position, as shown in FIG. 1, the downstream aperture 138 is in communication with the downstream end portion of the valve body 12 via the downstream opening 144 therein.

The downstream aperture 138 is sometimes referred to below as the downstream valve member control passageway 138. The downstream valve member control passageway 138 is shaped and disposed such that a portion of the fluid in the downstream end of the valve body 12 communicates with the downstream valve member control passageway 138, in the closed position of the valve member 120.

As shown in FIG. 1, the central aperture 140 extends generally transversely through a portion of the valve member 120, intersecting a portion of the flow port 130 therethrough. The central aperture 140 is therefore in communication with the flow port 130 through the valve member 130, for reasons to be made more apparent below.

The upper valve stem 122 has an upper end portion 146, a lower end portion 148 and an outer surface 150. A portion of the upper valve stem 122 and, more particularly, a portion of the outer periphery 150 thereof is sized to journally extend through the stem aperture 52 in the valve body 12.

The lower end portion 148 of the upper valve stem 122 is connected to the valve member 120 and, in a preferred form and as shown in FIG. 1, the upper valve stem 122 is formed integrally with the valve member 120. The valve member 120 is thus rotatable to an open or a closed position by rotating the upper valve stem 122 in the stem aperture 52 of the valve body 12.

An upstream bore 152 and a downstream bore 154 are formed in a portion of an uppermost end portion 156 of the upper valve stem 122. Each bore 152 and 154 extends a distance lengthwise through the upper valve stem 122, intersecting a portion of the uppermost end 156 thereof.

A central aperture 158 is formed in the uppermost end 156 and extends a distance lengthwise through a central portion of the upper valve stem 122. As shown in FIG. 1, a lower end portion 160 of the central aperture 158 has a smaller diameter than the remaining upper portion of the central aperture 158, thereby providing an upwardly facing surface 162 about the central aperture 158. The central aperture 158 is disposed in the upper valve stem 122 such that the lower end portion 160 thereof intersects the central aperture 140 of the valve member 120, thereby providing a fluidic communication between the flow port 130 in the valve member 12 and the central aperture 158 in the valve stem 122 via the central aperture 140 in the valve member 120.

A chamber aperture 164 extends transversely through the upper portion 146 of the upper valve stem 122, intersecting the outer periphery 150, the upstream bore 152, the downstream bore 154, and the central aperture 158 in the upper valve stem 122. The chamber aperture 164 therefore provides an intercommunication between the upstream bore 152, the downstream bore 154 and the central aperture 158.

The space formed in the upper portion 146 of the upper valve stem 122 by the upstream bore 152, the downstream bore 154, the upper portion of the central aperture 158, and the chamber aperture 164 provides what is sometimes referred to below as a chamber 166 in the upper valve stem 122.

As shown in FIG. 1, an upstream aperture 168 is formed in the upper valve stem 120 and extends a distance lengthwise therethrough, intersecting a portion of the chamber 166 therein. The upstream aperture 168 is disposed in the upper valve stem 122 such that the upstream aperture 168 of the upper valve stem 122 is in communication with the upstream valve member control passageway 136 of the valve member 120.

A downstream aperture 170 is also formed in the upper valve stem 122 and extends a distance lengthwise therethrough, intersecting a portion of the chamber 166 therein. The downstream aperture 170 of the upper valve stem 122 is disposed such that the downstream aperture 170 of the upper valve stem 122 is in communication with the downstream valve member control passageway 138 in the valve member 120.

A transverse aperture 172 (shown in dashed-lines in FIG. 1) extends transversely through the lower portion 148 of the upper valve stem 122, intersecting the lower end portion 160 of the central aperture 158 and the outer surface 150 of the upper valve stem 122. The transverse aperture 172 is disposed in the upper valve stem 122 such that the transverse aperture 172 is in communication with the chamber formed by the groove 58 in the valve body 12, thereby providing an intercommunication between the valve member control passageway 61 in the valve body 12 and the lower end portion 160 of the central aperture 158, for reasons which will be made more apparent below.

The central aperture 158, chamber 166, the upstream aperture 168, the downstream aperture 170, and the transverse aperture 172, form what is sometimes referred to below as the valve stem control passageway 173. From the foregoing it is apparent that the valve stem control passageway 173 is shaped and disposed to provide a fluidic communication between the valve body control passageway 61 and the upstream valve member control passageway 136 and the downstream valve member control passageway 138. Thus, the fluid in the upstream end of the valve body 12 or the downstream end of the valve body 12 is in fluidic communication with the piston surface 98 of the upstream seat assembly 80 and the downstream seat assembly 82 via the upstream valve member control passageway 136, the downstream valve member control passageway 138, the valve stem passageway 173 and the valve body passageway 61, thereby biasing the upstream seat assembly 80 and the downstream seat assembly 82 to a nonseating in the valve body 12, in one position of the valve assembly 10, as will be made more apparent below.

The handle actuator 124 basically comprises stem-engaging element 174 and a handle 176 pivotally secured to a portion of the stem-engaging element 174. The handle actuator 124 is secured to the upper end portion of the upper valve stem 122 and is adapted to rotate the upper valve stem 122, thereby opening or closing the valve member 120. The handle 176 is adapted to be pivoted to a nonactuated position or an actuated position with respect to the valve member actuator assembly 14, as will be described in greater detail below.

The stem-engaging element 174 has an upper end surface 178 which is basically flat and lies in a plane generally perpendicular to the central aperture 158 of the upper valve stem 122. A stem bore 180 is formed in a portion of a lower end surface 182 of the stem-engaging element 174. The stem bore 180 extends a distance into the stem-engaging element 174 and is sized to matingly receive a portion of the upper end portion 146 of the upper valve stem 122.

A pair of annular grooves 184 are formed in a portion of the wall formed by the stem bore 180 in the stem-engaging element 174. An elastomeric seal member 186 is disposed in each groove 184, and in one form, each elastomeric seal member 186 can be bonded in the respective annular groove 184.

In the assembled position, as shown in FIG. 1, a portion of the upper end portion 146 of the upper valve stem 122 is disposed in the stem bore 180 of the stem-engaging element 174, to a position wherein the uppermost end 156 of the upper valve stem 122 abuts the downwardly facing surface in the stem-engaging element 174 formed by the stem bore 180 therein. In this position, each elastomeric seal member 186 is sized to sealingly engage an adjacent portion of the outer periphery 150 of the upper valve stem 122, thereby forming a fluidtight seal therebetween.

As shown in FIG. 1, each elastomeric seal member 186 is disposed in the stem-engaging element 174 such that, in the assembled position, the elastomeric seal members 186 are disposed on opposite sides of the chamber aperture 164 through the upper valve stem 122. It is apparent from the foregoing that the seal members 186 not only provide a fluidtight seal between the stem-engaging element 174 and the upper stem 122, but also provides a seal for the chamber aperture 184.

A pair of apertures 188 are formed in a portion of the upper end surface 178 of the stem-engaging element 174, each aperture 188 extending lengthwise therethrough and intersecting a portion of the stem bore 180 formed therein. One of the apertures 188 is disposed in the stem-engaging element 174, such that in the assembled position the aperture 188 is generally aligned with the upstream bore 152 in the upper valve stem 122. The other aperture 188 is disposed in the stem-engaging element 174, such that in the assembled position the aperture 188 is generally aligned with the downstream bore 154 in the upper valve stem 122.

A seal bolt 190 is threaded into each aperture 188 and secured therein in a sealing position by a nut 192. Each seal bolt 190 is sized and disposed such that a lower seating and sealing end 194 thereof is disposed in a portion of the upstream bore 152 or the downstream bore 154 in the upper valve stem 122. Each seal bolt 190 therefore cooperates to seal one end of the upstream bore 152 or the downstream bore 154 and therefore cooperates with the upstream bore 152, the downstream bore 154, the upper portion of the central aperture 158 and the chamber aperture 164 to form the chamber 166 in the upper valve stem 122. It is also apparent that each seal bolt 190 cooperates to secure the handle actuator 124 to the upper valve stem 122, so that the valve assembly 10 may be opened or closed by the handle 176.

A flange 195 (partially shown in FIG. 1) is formed on a portion of the upper end surface 178 of the stem-engaging element 174, and extends generally perpendicularly therefrom. The handle 176 is pivotingly secured to a portion of the flange 195 by a pin 196.

A slot 198 is formed through one end portion of the handle 176 and, in the assembled position, as shown in FIG. 1, the slot 198 is generally aligned with the central aperture 158 of the valve stem 122, for reasons to be made more apparent below.

A bias spring 200 is disposed between a portion of the handle 176 and a portion of the stem-engaging element 174. One end of the bias spring 200 is secured in a recess 202 in the handle 176, and the opposite end of the spring 200 is secured in a recess 204 in the upper end surface 178 of the stem-engaging element 174. The bias spring 200 is sized and disposed to bias the handle 176 generally in an upward direction toward a nonoperating position thereof, for reasons to be described in greater detail below.

An upstream ball check 206 is disposed in a portion of the chamber 166 in the upper valve stem 122, generally adjacent the intersection of the upstream aperture 168 of the upper valve stem 122 with the chamber 166. The upstream ball check 206 is shaped and disposed to encompass the upstream aperture 168 in the valve stem 122 and to seatingly and sealingly engage the adjacent portion of the valve stem 122 in a seating position of the upstream ball check 206. In a seating position of the upstream ball check 206, as shown in FIG. 1, the upstream ball check 206 is therefore disposed such that fluid from the upstream aperture 168 in the valve stem 122 generally biases or moves the upstream ball check 206 to a nonseating position, and thus the fluid in the upstream aperture 168 is permitted to flow into the chamber 166 of the upper valve stem 122. However, the upstream ball check 206 is disposed such that fluid in the chamber 166 cannot flow, or rather the upstream ball check 206 seatingly prevents fluid from flowing from the chamber 166 into the upstream aperture 168. It is apparent from the foregoing that the upstream ball check 206 functions generally in the nature of a ball check valve, a type of function commonly known in the art and utilized to permit flow in one direction and preventing flow in an opposite direction through a particular fluid opening.

A downstream ball check 208 is disposed in a portion of the chamber 166 in the upper valve stem 122, generally adjacent the intersection of the downstream aperture 170 in the valve stem 122 with the chamber 166. The downstream ball check 208 is shaped and disposed to encompass the downstream aperture 170 in the valve stem 122, and to seatingly and sealingly engage the adjacent portion of the valve stem 122 in a seating position of the downstream ball check 208, as shown in FIG. 1. The downstream ball check 208 is thus disposed such that fluid from the downstream aperture 170 in the valve stem 122 generally unseats or moves the downstream ball check 208 to a nonseating position and thereby allows fluid to flow generally from the downstream aperture 170 into the chamber 166 of the valve stem 122. However, the downstream ball check 208 is disposed such that fluid in the chamber 166 cannot flow into the downstream aperture 170 of the valve stem 122. It is apparent from the foregoing that the downstream ball check 208 and the upstream ball check 206 function in a somewhat similar manner to allow the flow of fluid in only one direction thereby.

A central ball check 210 is disposed in a portion of the lower end portion 160 of the central aperture 158. In a seating position (not shown) the central ball check 210 is interposed between the central aperture 158 of the valve stem 122 and the central aperture 140 of the valve member 122. The central ball check 210 is shaped to seatingly and sealingly engage the adjacent portion of the valve stem 122, in a seating position of the central ball check 210, thereby preventing the flow of fluid in a direction generally from the central aperture 158 in the valve stem 122 to the central aperture 140 in the valve member 120. It is apparent from the foregoing that the central ball check 210 functions in a manner similar to the upstream and the downstream ball checks 206 and 208, described before, to allow the flow of fluid in only one direction thereby. The central aperture 140 of the valve member 120 is sometimes referred to as a bleed passageway 140. The bleed passageway 140 is adapted to bleed fluid retained in the valve body control passageway 61, in one position thereof, thereby removing the fluid pressure exerted on the piston surface 98 of the upstream seat assembly 80 or the downstream seat assembly 82 and thus allowing the seat assemblies 80 or 82 to move to a seating position in the valve body 12. The central ball check 210 is adapted and disposed to cooperate with a control valve member 212 to control the bleed function of the bleed passageway 140, described above, in a manner to be made apparent below.

The control valve member 212 has an upper end 214 and a lower end 216 and is reciprocatingly disposed in a portion of the valve stem control passageway 173 and, more particularly, in a portion of the central aperture 158 of the valve stem 122. Since the valve stem 122 is connected to the valve member 120, the control valve member 212 is sometimes referred to below as being carried by the valve member 120. The control valve member 212 has a seating surface 218 formed about a portion thereof, generally between the upper end 214 and the lower end 216 thereof. The seating surface 218 is shaped and disposed to seatingly and sealingly engage a portion of the upwardly facing surface 162 in the upper valve stem 122, when the control valve member 212 has been reciprocated to a seating position in the central aperture 158, as shown in FIG. 1.

A portion 220 of the lower end 216 portion of the control valve member 212 is shaped to engage a portion of the central ball check 210 when the control valve member 212 has been reciprocated or moved to a seating position in the valve stem control passageway 173. The lower end portion 220 of the control valve member 212 is shaped to bias the central ball check 210 to a nonseating position when the control valve member 212 has been moved to a seating position in the central aperture 158.

It is apparent from the foregoing and from FIG 1, that the control valve member 212 seats in the central aperture 158 at a position generally above the transverse aperture 172 in the upper valve stem 122. Therefore, when the control valve member 212 has been reciprocated to the seating position thereof, the upper portion of the central aperture 158 in the valve stem 122 is not in communication with the valve body control passageway 61, thereby closing the valve stem control passageway 173.

Thus, the control valve member 212 is movably disposed and adapted to seatingly and sealingly engage a portion of the upper valve stem 122 thereby closing the valve stem control passageway 173 when the control valve member 212 is in the seating position thereof and opening the valve stem control passageway 173 when the control valve member 212 is in the nonseating position thereof. In the seating position of the control valve member 212, the fluid in the upstream end of the valve body 12 is therefore not in communication with the piston surface 98 of the upstream seat assembly 80 or the downstream seat assembly 82 via the upstream valve member control passageway 136, the valve stem control passageway 173, the valve body control passageway 61. In the nonseating position of the control valve member 212 the fluid in the upstream end of the valve body 12 is in communication with the piston surface 98 of the upstream seat assembly 80 and the downstream seat assembly 82 via the upstream valve member control passageway 136, the valve stem control passageway 173 and the valve body control passageway 61.

It is also apparent that when the control valve member 212 has been moved to a nonseating position, thereby disengaging the seat portion 220 of the control valve member 212 from the central ball check 210, the central ball check 210 will move into a seating position in the lower portion 160 of the central aperture 158 with respect to the central or bleed aperture 140 in the valve member 120. Thus, the control valve member 212 is adapted to control the central ball check 210 and thereby controlling the bleeding of the fluid in the valve member control passageway 61 such that the fluid therein is bled through the bleed aperture 140 only when the control valve member 212 is in the seating position in the valve stem passageway 173, for reasons which will be made more apparent below. It should also be noted that the central ball check 210 cooperates with the control valve member 212, to provide fluidic communication between the piston surfaces 98 and the flow port 130 in the valve member 120. In this manner, the upstream seat assembly 80 and the downstream seat assembly 82 are retained in a nonseating position when the valve assembly 10 is in the open position, as will be made more apparent below.

A rod 222 is formed on the upper end 214 of the control valve member 212 and extends generally upwardly therefrom. The rod 222 is shaped and disposed to reciprocatingly extend through an aperture 224 formed through a portion of the stem-engaging element 174, generally between the apertures 188 therein. The rod 222 is also shaped and sized to reciprocatingly extend through the slot 198 in the valve handle 176. A head 226 is formed on the uppermost end portion of the rod 222. The head 226 is sized and disposed to engage an adjacent portion of the valve handle 176 and to maintain an engagement between the valve handle 176 and the rod 222, during the pivoting of the valve handle 176.

A bias spring 228 is disposed in a portion of the central aperture 158 of the valve stem 122. The upper end of the spring 228 engages a washer 227a and holds a seal ring 227b around the rod 222 against the element 174. The lower end of spring 228 engages the upper end 214 of the control valve member 212. The bias spring 228 is thus sized and disposed to bias the control valve member 212 generally toward a seating position in the central aperture 158 of the upper valve stem 122.

It is apparent from the foregoing that as the handle 176 is pivoted in a general direction 230 against the biasing force of the spring 200, the control valve member 212 will be reciprocated in the central aperture 158 of the valve stem 122 generally toward a nonseating position therein. The bias spring 200 generally biases the handle 176 in a direction 232 toward a nonoperating position thereof.

When the valve handle is pivoted in a direction 230, thereby reciprocating the control valve member 212 to a nonseating position, the central ball check 210 will move to a seating position with respect to the central or bleed aperture 140 of the valve member 120. In the nonseating position of the control valve member 212, the fluid in the upstream end 36 portion of the valve assembly 10 will be in communication with the piston surfaces 98 of each seat assembly 80 and 82 via the valve member control passageway 136, the valve stem control passageway 173 and the valve body control passageway 61. The fluid in the upstream end 36 portion of the valve assembly 10 will therefore contact the piston surfaces 98 of each seat assembly 80 and 82, thereby moving each seat assembly 80 and 82 in a direction generally away from the valve member 120 and toward a nonseating position in the valve body 12. The handle 176 is thus connected to the control valve member 212 and is adapted to cooperate therewith to reciprocate or move the control valve member 212 to a nonseating position in the valve stem control passageway 173 as the handle 176 is pivoted in a direction 230 from a nonactuated position toward an actuated position thereof. The handle actuator 124 is thus adapted to control the opening or closing of the valve stem control passageway 173 and therefore cooperates to control the position of the upstream seat assembly 80 and the downstream seat assembly 82 in the valve body 12.

The lower valve stem 126 is connected to the valve member 120 and, as shown in FIG. 1, the lower valve stem 126 is generally radially aligned with the upper valve stem 122. The lower valve stem 126 has an upper end 234 and a lower end 236, and is shaped and sized to journally extend through the aperture 114 in a valve body 12. A flange ring 238 is formed adjacent the upper end 234 of the lower valve stem 126 and extends generally radially therefrom. The flange ring 238 is disposed and shaped such that, in the assembled position, the seal member 118 sealingly engages a portion of the flange ring 238, thereby providing a fluidtight seal between the flange ring 238 and the valve body 12.

A pair of flange tips 240 are formed on a portion of the lower end 236 of the lower valve stem 126. Each flange tip 240 extends a distance generally perpendicularly from the lower end 236 of the lower valve stem 126, for reasons which will be made more apparent below.

In the assembled position, as shown in FIG. 1, a bar 242 is disposed in a recess 244 in the valve body 12 and is secured therein in a suitable manner, such as by welding the bar 242 to the valve body 12. The bar 242 is disposed on the valve body 12 to cooperate with the flange tips 240 on the lower valve stem 126 to limit the rotational movement of the valve member assembly 14, such that the valve member 120 is positively positioned in an open or closed position.

OPERATION OF FIG. 1

The valve assembly 10, described before, is adapted to control the flow of fluid between adjacent pipe sections, and more particularly, the valve assembly 10 is adapted to efficiently move the seat assemblies therein to a nonseating position with respect to the valve member 120 prior to rotating the valve member to an open or a closed position, thereby reducing the frictional contact therebetween. As mentioned before and for the purpose of clarity of description, the fluid flowing through the valve assembly 10 will be assumed to flow generally from the opening 26 in the flange 18, through the valve assembly 10, and out the opening 24 of the flange 16. As will become apparent below, the valve assembly 10 is adapted to control the flow of fluid therethrough in either direction, or in other words the valve assembly 10 is bidirectional.

The valve assembly 10, as shown in FIG. 1, is in the closed position, that is a position wherein the valve member 120 has been rotated to a position wherein the flow port 130 therethrough is disposed generally transversely or at a right angle with respect to the bore 40 in the valve body 12. In this position, fluid will not flow through the valve assembly 10.

In the closed position of the valve assembly 10, the fluid in the upstream end of the valve assembly 10 will act upon the nonvalve member end 86 of the upstream seat assembly 80, thereby cooperating with the spring 100 to bias the upstream assembly 80 into a seating engagement with respect to the valve member 120. The downstream seat assembly 82 is biased generally toward a seating position with respect to the valve member 120 by the spring 100 associated therewith, however the seating engagement of the downstream seating assembly 82 is not pressure augmented in a manner similar to that described above with respect to the upstream seat assembly 80.

A portion of the fluid in the upstream end of the valve assembly 10 will flow into the chamber 166 of the upper valve stem 122 via the upstream aperture 136 in the valve member 120 and the upstream aperture 168 in the upper valve stem 122. In this position, the fluid in the chamber 166 is prevented from flowing into the lower portion 160 of the central aperture 158 due to the seating engagement between the control valve member 212 and the seating surface 162 in the upper valve stem 122. The flow in the chamber 166 is also prevented from flowing into the downstream aperture 170 or the downstream aperture 138 due to the seating engagement of the downstream ball check 208 in the upper valve stem 122.

When it is desired to rotate the valve member 120 to the open position, that is a position wherein the flow port 130 in the valve member 120 is generally aligned with the bore 40 through the valve body 12, the operator will initially reciprocate the handle 176 in a direction 230. As the handle 176 is reciprocated in a direction 230, the control valve member 212 is reciprocated toward a nonseating position in the central aperture 158 of the upper valve stem 122 via the interconnection between the valve handle 176 and the control valve member 212 provided by the rod 222.

When the control valve member 212 has been reciprocated to a nonseating position in the central aperture 158, the central ball check 210 will move into a seating position in the lower portion 160 of the central aperture 158. In the nonseating position of the control valve member 212, the fluid in the chamber 166 of the upper valve stem 122 will be in communication with the piston surface 98 of each seat assembly 80 and 82 via the upstream valve member control passageway 138, the valve stem control passageway 173 and the valve body control passageway 61. The fluid in the chamber 166 is not in communication with the downstream end portion of the valve assembly 10, due to the seating engagement of the downstream ball check 208 in the valve stem control passageway 173. The fluid in the central or bleed aperture 150 is not in communication with the flow port 130 in the valve member 120, due to the seating engagement of central ball check 210 therebetween. Since each seat assembly 80 and 82 is in sliding engagement with the adjacent portions of the valve body 12 and the adjacent portion of the flange seats 74, each seat assembly 80 and 82 will be biased by the contact of the upstream fluid pressure with each piston surface 98, generally toward a nonseating position in the valve body 12, with respect to the valve member 120.

After the seating assemblies 80 and 82 have been biased to a nonseating position, as described above, the handle 176 is then rotated, thereby rotating the valve member 120 generally toward an open position due to the interconnection between the valve handle 170 and the valve member 120 provided by the stem-engaging element 174 and the upper valve stem 122. The flange tips 240 cooperate with the bar 242 to limit the rotational movement of the valve member 120 and to positively position the valve member 120 in a fully open or a fully closed position.

When the valve member 120 has been rotated by the handle 176 to the open position, the operator will release the handle 176. When the operator releases the handle 176, the spring 200 will bias the handle 176 in the general direction 232, thereby moving or reciprocating the control valve member 212 to a seating position in the central aperture 158 in the valve stem control passageway 173.

As the control valve member 212 is reciprocated to a seating position, the central ball check 210 is moved by the lower portion 220 of the control valve member 212 to a nonseating position in the lower portion 160 of the central aperture 158.

In this position, the fluid flowing through the valve assembly 10 is in communication with the piston surfaces 98 via the bleed aperture 140, thereby biasing the seat assemblies 80 and 82 to a nonseating position. Thus, the upstream seat assembly 80 and the downstream seat assembly 82 remain in a nonseating position in the valve body 12 when the valve assembly is in the open position.

When it is desired to close the valve assembly 10, the operator will again move or pivot the handle 176 in a direction 230, thereby moving the control valve member 212 to a nonseating position in the valve stem passageway 173, in a manner similar to that described before. The central ball check 210 will move to a seated position in the valve stem control passageway 173, thereby preventing the fluid retained in the valve body control passageway 61 from being bled through the bleed aperture or bleed passageway 140. It is apparent from the foregoing that the fluid retained in the valve body control passageway 61 will thus retain a biasing contact with the piston surfaces 98, thereby holding the upstream seat assembly 80 and the downstream seat assembly 82 in a nonseating position during the closing of the valve assembly 10.

After the valve member 120 has been rotated to the closed position, the handle 176 is released, the spring 200 will bias the handle 176 in a direction 232, thereby seating the control valve member 212 in the valve stem control passageway 173. Thus, the central ball check 210 will be moved to a nonseating position in the valve stem control passageway 173, thereby bleeding the fluid retained in the valve body control passageway 61 through the bleed passageway 140.

Since the biasing force created by the fluid acting against the piston surfaces 98 of the seat assemblies 80 and 82 has been removed or bled to the bleed passageway 140 in the valve member 120, each seat assembly 80 and 82 is again biased toward a seating position in the valve body with respect to the valve member 120 via the respective spring 100 disposed adjacent thereto. In this position, the fluid in the upstream end 36 portion of the valve assembly 10 will again act on the non valve member end 86 of the upstream seat assembly 80, thereby augmentingly biasing the upstream seat assembly 80 toward a seating position with respect to the valve member 120. Thus, in the closed position of the valve assembly 10, as described above, the fluid in the upstream end 36 of the valve assembly 10 augments the biasing force provided by the spring 100 disposed adjacent the upstream seat assembly 80.

It is apparent from the foregoing description, that the fluid flow through the valve assembly 10 could be in a direction opposite from that generally described above. In other words, the upstream end of the valve assembly 10 could be the end 38 of the valve body 12. Should the flow be in this direction, the valve assembly 10 will operate similar to that described before to move each seat assembly 80 and 82 to a nonseating position with respect to the valve member 120 prior to the opening or closing of the valve member 120. The salient difference in the precise operation being that when the valve assembly 10 is oriented such that the end 38 of the valve body 12 faces in a general upstream direction, the downstream control passageway 138 of the valve member 120 and the downstream aperture 170 in the upper valve stem 122 will function in a manner similar to that described before with respect to the upstream control passageway 136 in the valve member 120 and the upstream aperture 168 in the upper valve stem 122. In other words the function of these two passageways are generally reversed.

Since the seat assemblies 80 and 82 of the valve assembly 10 are not in seating contact with the valve member 120 during the rotation of the valve member 120 from a closed to an open position, it is feasible to bond the elastomeric seal member 134 about a portion of the outer surface 128 of the valve member 120 and to utilize a metal or reinforced plastic seating surface 94 on each seat assembly 80 and 82. One of the salient advantages of this type of construction is that the elastomeric seal member 134 is not exposed to the throttling effect of the fluid flowing through the valve assembly 10 as the valve member 120 is opened or closed, and the seating surfaces 94 of the upstream and the downstream seat assemblies 80 and 82, which would be exposed to the throttling effect of the fluid flowing through the valve assembly 10 can be easily constructed of a material less susceptible to the wearing or the erosion caused by the throttling effect of the fluid.

It should also be noted that since each seat assembly 80 and 82 is reciprocated or slid to a nonseating position prior to the opening or the closing of the valve assembly 10, particle buildup and corrosion which may occur between the seat assemblies 80 and 82 in the valve member 120 are virtually eliminated, or rather the wearing effect of the corrosion and particle buildup is virtually eliminated. This particular feature reduces the field maintenance required for the valve assembly 10, and substantially increases the operational life of the seat assemblies 80 and 82 in the valve member 10.

Since the seat assemblies 80 and 82 are moved to a nonseating position prior to the opening or the closing of the valve assembly 10, the frictional resistance between the seat assemblies 80 and 82, and more particularly, between the upstream seat assembly and the valve member 120 during the opening or closing of the valve member 120, is substantially reduced. This particular feature thus reduces the torque required to rotate the valve member 120 from an open or a closed position, thereby enabling the control of high-pressure fluid with smaller valve actuators, not shown (the valve actuators being secured to the upper valve stem 122 and adapted to automatically open or close the valve assembly 10 in response to a particular control signal, such valve actuators are well known in the art and no further description is required herein). It should also be noted that the ends of the valve stems 122 and 236 remote from the valve member 120 are pressure balanced to further minimize the torque requirements. The present structure permits the control of large sizes of the valve assembly in utilizing a smaller valve actuator for either shutoff or control valve purposes.

Figure 2:
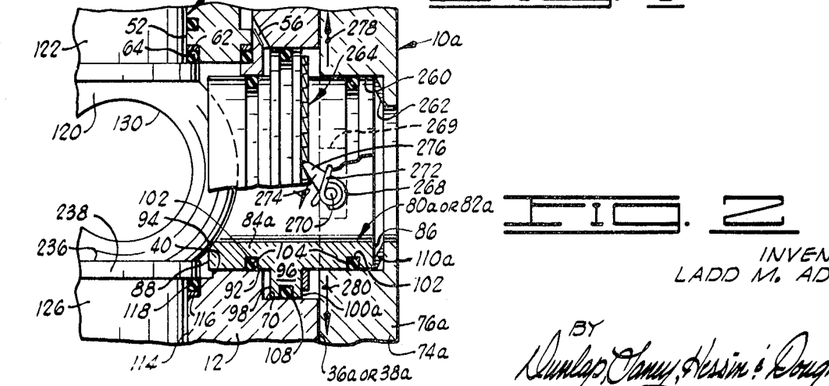
FIG. 2 is a fragmentary, partial cross-sectional view of a modified valve assembly similar to the valve assembly of FIG. 1, but showing a modified seat assembly disposed therein.

EMBODIMENT OF FIG. 2

Shown in FIG. 2 is a modified valve assembly 10a, which is constructed similar to the valve assembly 10 described before. The salient difference between the valve assembly 10a and the valve assembly 10 is that the upstream and downstream seat assemblies 80a and 82a of the valve assembly 10a are each adapted such that they may be rotated in small increments as they are retracted or moved to a nonseating position with respect to the valve member 120, thereby effecting an overall reduced, consistent wearing of each seating surface 94.

The flange seat 74a is constructed similar to the flange seat 74, however, the flange seat 74a is provided with an annular recess 260, intersecting the valve member end of each flange seat ring 74a. The recess 260 provides an annular wall 262 about each flange seat 74a, generally facing the valve member 120 of the valve assembly 10a. Each recess 260 is sized and disposed to slidingly receive a portion of one of the seat rings 84a generally adjacent the nonvalve member end 86 thereof.

As shown in FIG. 2, a Belleville spring 110a is disposed generally between the annular wall 262 formed in the flange ring 74a and the nonvalve member end 86 of each seat assembly 80a and 82a. The Belleville spring 110a is sized such that a portion thereof engages the annular wall 262 and another portion thereof engages a portion of the nonvalve member end 86 of the respective seat ring 84a. Each spring 110a is sized and disposed to biasingly engage one of the seat rings 84a and to bias that seat ring 84a in a direction generally toward a seating position with respect to the valve member 120. It is apparent from the foregoing that the Belleville spring 110a functions in a manner similar to the Belleville spring 110 described before with respect to the valve assembly 10, the salient difference being that each Belleville spring 110a is disposed to engage the nonvalve member end 86 of one of the seat rings 84a, for reasons which will become apparent below.

A plurality of ratchet teeth 264 are formed annularly about a portion of the biasing surface 100a, generally adjacent the outer periphery 92 of each seat ring 84a. A pall 268 is rotatably disposed in a recess 269 formed in a portion of the flange seat 74a and is rotatably secured therein by a pin 270. A spring 272 is disposed about the pin 270 generally between the pall 268 and the surface formed in the flange seat 74a by the recess 269. The spring 272 is shaped and disposed to bias the pall 268 in a general direction 274 toward an engaging position with respect to the ratchet teeth 264.

The end 276 of the pall 268 is shaped to engage a portion of the ratchet teeth 264, as shown in FIG. 2, such that each seat ring 84a can be rotated in a general direction 278, but cannot be rotated in a direction 280, due to the engagement of the end 276 of the pall 268 with the ratchet teeth 264 of each seat ring 84a.

OPERATION OF FIG. 2

The valve assembly 10a will operate in a manner similar to the valve assembly 10 described before. The salient difference in the operation of the valve assembly 10a being that as the fluid from the upstream end of the valve assembly 10a is directed into biasing contact with the piston surface 98, each seat ring 84a will be incrementally rotated in a general direction 278.

It is apparent from the foregoing that after the valve assembly 10a has been closed and each seat ring 84a is again moved to a seating position with respect to the valve member 120, the seating surface 94 of each seat ring 84a will seatingly and sealingly engage a different portion of the valve member 120 with respect to the portion engaged thereby prior to the rotation of each seating ring 84a. The rotation of the seat assemblies 80a substantially reduces uneven wearing in the respective seating surfaces 94, thereby increasing the operational life of each seat assembly 80a and 82a, and cooperates to substantially maintain the seating and sealing integrity of each seat assembly 80a and 82a throughout the operational life thereof.

It is apparent from the foregoing that the valve assembly 10a retains all of the advantages of the valve assembly 10, shown in FIG. 1, and in addition provides a seat assembly which is incrementally rotatable. It should be particularly noted that if the valve assembly 10a described herein, were not adapted to move the seat assemblies 80a and 82a therein to a nonseating position prior to the opening or closing of the valve assemblies, much higher torque would be required to rotate the seat assemblies, as described above. The additional torque, referred to above, would be required to overcome the frictional resistance between the seat assemblies 80a and 82a and the valve member 120. In most applications and particularly in applications involving the handling or controlling of high-pressure fluid, it is thus impractical or virtually impossible to provide for incremental rotation of the seat assemblies in an economical manner.

Changes may be made in the construction and arrangements of the parts or the elements of the various embodiments as disclosed herein without departing from the spirit and scope of the invention as defined in the following claims.

What is claimed is:

1. A valve assembly for controlling the flow of fluid between a pair of adjacent pipe sections, comprising:
   a valve body having upstream and downstream ends and a bore extending therethrough intersecting the upstream and downstream ends, the valve body also having a control passageway therein communicating with the bore near the upstream end of the body;
   means for securing the valve body between the pipe sections with the valve body bore aligned with the pipe sections;
   a valve member in the valve body bore movable between open and closed positions and having a valve stem portion projecting through the valve body at a right angle to the valve body bore, the valve member having a control passageway therein communicating with the valve body control passageway and the upstream end of the valve body bore when the valve member is closed;

a seat assembly slideably positioned in the upstream end of the valve body bore shaped to mate with the valve member in one position thereof and sealing the end of the valve body control passageway at the valve body bore, the seat assembly having a piston surface thereon facing the valve member and communicating with the valve body control passageway;

a spring anchored in the valve body bore upstream of the seat assembly urging the seat assembly toward the valve member;

a control valve carried by the valve member in a position to open and close the valve member control passageway; and a handle pivotally secured to the stem portion of the valve member and connected to the control valve for moving the control valve between its open and closed positions, whereby the seat assembly may be moved against the action of the spring away from the valve member by actuation of the handle to move the control valve and direction upstream fluid pressure against said piston surface prior to moving the valve member from a closed to an open position.

2. A valve assembly for controlling the flow of fluid therethrough, the fluid flowing generally from an upstream end portion thereof toward a downstream end portion thereof, comprising:

a valve body having an upstream end and a downstream end and a bore extending therethrough, a stem aperture through a portion of the valve body intersecting a portion of the bore therethrough, a valve body control passageway formed in a portion of the valve body and shaped and disposed such that a portion thereof intersects and communicates with a portion of the bore in the valve body;

an upstream seat assembly slidably disposed in a portion of the bore in the valve body generally near the upstream end thereof, the upstream seat assembly being movable between seating and nonseating positions in the valve body and having an outer surface, an annular seating surface and a piston surface formed on a portion thereof, the upstream seat assembly being disposed in the valve body and the piston surface thereon being shaped and disposed such that fluid pressure acting on the piston surface via the valve body control passageway slidably moves the upstream seat assembly generally toward the upstream end of the valve body toward a nonseating position in the valve body;

a valve member assembly supported by the valve body, comprising:

a valve member, having an outer surface and being movably disposed in the bore of the valve body generally between the upstream end and the downstream end thereof, the valve member being moveable between open and closed positions, a portion of the outer surface being shaped and disposed to seatingly and sealingly engage the seating surface of the upstream seat assembly in the seating position of the upstream seat assembly, the valve member also having an upstream valve member control passageway formed in a portion thereof, the upstream valve member control passageway being shaped and disposed such that a portion of the fluid in the upstream end of the valve body communicates with the upstream valve member control passageway in the closed position of the valve member;

an upper valve stem, having an outer surface, an upper end and a lower end, a portion thereof being journally disposed in the stem aperture of the valve body, the lower end portion of the upper valve stem being connected to the valve member, the upper valve stem being adapted to rotate the valve member between open and closed positions in the valve body, the upper valve stem also having a valve stem control passageway formed through a portion thereof, the valve stem control passageway being shaped and disposed to provide communication between valve body control passageway and the upstream valve member control passageway, thereby providing communication between the fluid in the upstream end of the valve body and the piston surface of the upstream seat assembly, in one position of the valve assembly; and control valve means disposed in a portion of the valve stem control passageway and being movable between seating and nonseating positions therein, the control valve means being shaped to seatingly engage a portion of the upper valve stem in a seating position thereof and to close the valve stem control passageway thereby preventing the flow of fluid therethrough, the control valve means being shaped and disposed to open the valve stem control passageway in a nonseating position thereby allowing the flow of fluid therethrough;

bias means disposed in the valve body and being sized and and adapted to bias the upstream seat assembly toward a seating position in the valve body;

bleed means in communication with the valve body control passageway and being disposed and adapted to bleed fluid from the valve body control passageway in one position thereof, thereby removing fluid pressure being exerted on the piston surface of the upstream seat assembly; and a handle actuator assembly, comprising a stem engaging portion connected to the upper end portion of the upper valve stem and being adapted to move the upper valve stem, thereby opening or closing the valve member; and a handle portion pivotably secured to the stem-engaging portion and being pivotable from a nonactuated to an actuated position, the handle portion being connected to the control valve means and adapted to position the control valve means alternately in its seating and nonseating positions in the valve stem control passageway, the handle portion being thereby adapted to control the opening and the closing of the valve stem passageway and thereby cooperating to control the position of the upstream seat assembly in the valve body.

3. The valve assembly of claim 2 wherein the valve body control passageway of the valve body includes a groove formed in a portion of the valve body generally about a portion of the stem aperture therein and an opening being formed in a portion of the valve body, the opening being disposed and shaped such that a portion thereof intersects and communicates with a portion of the bore in the valve body and another portion of the opening being in communication with the groove in the valve body.

4. The valve assembly of claim 2 wherein the valve body includes aperture means formed in the upper portion thereof intersecting a portion of the bore therethrough, and an opening formed therein shaped and disposed such that a portion thereof intersects a portion of the bore in the valve body and another portion thereof intersects a portion of the aperture means formed through the upper portion of the valve body; and wherein the valve body is defined further to include: a stem-engaging element secured in the aperture means in the upper portion of the valve body, the stem aperture of the valve body being formed through a central portion of the stem-engaging element, and the stem-engaging element having an opening formed therein, the last-mentioned opening being shaped and disposed to cooperate with the opening in the valve body in the assembled position of the stem-engaging element to define the valve body control passageway.

5. The valve assembly of claim 4 wherein the aperture means includes a counterbore extending from the outer surface of the valve body, thereby forming an upwardly facing surface in the valve body, the counterbore being shaped to slidingly receive the stem-engaging element and the upwardly facing surface being shaped and disposed to engage one end of the stem-engaging element, thereby positively locating the stem-engaging element in an assembled position in the valve body.

6. The valve assembly of claim 4 defined further to include seal means disposed between the stem-engaging element and the valve body, the seal means being shaped and disposed to provide a fluidtight seal therebetween.

7. The valve assembly of claim 2 wherein the valve member includes an upstream aperture intersecting a portion of the outer surface thereof, thereby forming an upstream opening in the valve member, the upstream aperture being disposed such that the upstream opening communicates with the upstream end portion of the valve body bore in the closed position of the valve member, the upstream aperture defining the valve member control passageway.

8. The valve assembly of claim 2 wherein the upper valve stem includes a chamber formed in the upper portion and an upstream aperture formed in the lower portion thereof, the upstream aperture intersecting the chamber in the upper valve stem, the upstream aperture and the chamber in the upper valve stem defining a portion of the valve stem control passageway, and the upstream aperture being disposed such that the upstream aperture in the upper valve stem communicates with the valve member control passageway; and wherein the valve member assembly is defined further to include:

an upstream ball check disposed in the chamber in the upper valve stem and being shaped to seatingly and sealingly engage an adjacent portion of the upper valve stem around the upstream aperture in a seating position thereof, the upstream ball check being disposed and adapted such that the fluid flowing from the upstream aperture in the upper valve stem into the chamber moves the upstream ball check to a nonseating position and to seatingly and sealingly engage a portion of the upper valve stem to prevent the flow of fluid from the chamber toward the upstream aperture in the upper valve stem.

9. The valve assembly of claim 8 wherein the upper valve stem includes a central aperture, having an upper end portion and a lower end portion, the upper end portion of the central aperture being in communication with a portion of the chamber, and wherein the upper valve stem further includes a transverse aperture providing communication from the lower end portion of the central aperture and the valve body passageway.

10. The valve assembly of claim 9 wherein the control valve means is further defined as being disposed in the central aperture of the upper valve stem.

11. The valve assembly of claim 10 wherein the lower end portion of the central aperture is defined further as being of a smaller diameter than the upper end portion of the central aperture, thereby providing an upwardly facing surface about the central aperture generally between the upper end portion and the lower end portion thereof, the upwardly facing surface in the central aperture being shaped and disposed to seatingly and sealingly engage a portion of the control valve means in a seating position thereof.

12. The valve assembly of claim 11 wherein the control valve means is defined further to include:

a control valve member, having an upper end and a lower end and a seating surface formed about a portion thereof generally between the upper end and the lower end thereof, the control valve member being reciprocally disposed in a portion of the central aperture of the upper valve stem, the seating surface of the control valve member being shaped and disposed to seatingly and sealingly engage the upwardly facing surface in the central aperture in the seating position of the control valve member, the upper end portion of the control valve member being connected to the handle portion of the handle actuator.

13. The valve assembly of claim 12 wherein the valve member assembly is defined further to include:

a bias means disposed in the upper end portion of the central aperture, the bias means being shaped and disposed to biasingly engage a portion of the upper valve stem and the upper end portion of the control valve member, thereby biasing the control valve member generally toward a seating position in the central aperture of the upper valve stem.

14. The valve assembly of claim 12 wherein the control valve member is defined further to include; a rod, one end of the rod being connected to the upper end of the control valve member and the opposite end of the rod being connected to the handle portion of the handle actuator, thereby providing the interconnection between the handle and the control valve member.

15. The valve assembly of claim 14 wherein the handle actuator assembly is defined further to include; a bias means disposed between the stem-engaging portion and the handle portion of the handle actuator, the bias means being sized and disposed to pivotingly bias the handle portion to a nonactuated position.

16. The valve assembly of claim 9 wherein the bleed means includes a central aperture formed in a portion of the valve member in communication with the lower end portion of the central aperture in the upper valve stem, thereby providing a bleed passageway adapted to allow fluid retained in the valve body control passageway and a portion of the central aperture in the upper valve stem to be bled therefrom; and wherein the valve member assembly is further defined to include:

bleed control means disposed in a portion of the bleed passageway to open and close the bleed passageway, the fluid being bled from the valve body passageway and a portion of the valve stem passageway in an opened position of the bleed control means and retained therein in a closed position of the bleed control means.

17. The valve assembly of claim 16 wherein the bleed control means is further defined to include:

a central ball check disposed in a position of the central aperture in the upper valve stem, the central ball check being sized and disposed to seatingly and sealingly engage a portion of the upper valve stem in a closed position of the bleed control means.

18. The valve assembly of claim 17 wherein the lower end portion of the control valve member is further defined as being shaped to engage the central ball check and adapted to move the central ball check to a nonseating position in a seating position of the control valve member.

19. The valve assembly of claim 16 wherein the valve member is further defined as being spherically shaped and having a flow port formed therethrough, the central aperture of the valve member intersecting said flow port.

20. The valve assembly of claim 2 defined further to include:

a downstream seat assembly slidably disposed in a portion of the bore in the valve body generally near the downstream end thereof, the downstream seat assembly being movable between seating and nonseating positions in the valve body and having an outer surface, an annular seating surface and a piston surface formed on a portion thereof; and wherein the valve body control passageway is further defined as being shaped and disposed such that a portion thereof communicates with the piston surface of the downstream seat assembly, such that fluid pressure acting on the piston surface of the downstream seat assembly via the valve body control passageway slidably moves the downstream seat assembly generally toward the downstream end of the valve body to a nonseating position in the valve body; and wherein the valve assembly is further defined to include a bias means disposed in the valve body and adapted to bias the downstream seat assembly to a seating position in the valve body.

21. The valve assembly of claim 20 wherein the valve member includes a downstream valve member control passageway formed in a portion thereof, the downstream valve member control passageway being shaped and disposed such that a portion of the fluid in the downstream end of the valve body communicates with the downstream valve member control passageway in the closed position of the valve member; and wherein the stem control passageway in the upper valve stem is further defined as being shaped and disposed to provide communication between the valve body control passageway and the downstream valve member control passageway and the upstream valve member control passageway, thereby providing communication between the fluid in the downstream end and the upstream end of the valve body and the piston surfaces of the upstream seat assembly and the downstream seat assembly in one position of the valve assembly.

22. The valve assembly of claim 21 wherein the valve body includes an aperture formed in the upper portion thereof intersecting a portion of the bore therethrough, and an annular opening formed therein and being shaped and disposed such that a portion thereof intersects a portion of the bore in the valve body generally near the upstream end portion thereof and such that a portion thereof intersects a portion of the bore generally near the downstream end portion thereof, another portion of the annular opening in the valve body intersecting a portion of the aperture formed through the upper portion of the valve body; and wherein the valve body is defined further to include; a stem-engaging element having opposite ends and an outer periphery, disposed in the aperture in the upper portion of the valve body and secured therein in an assembled position, the stem aperture of the valve body being formed through a central portion of the stem-engaging element, intersecting the opposite ends thereof, the stem-engaging element having an opening formed therein, the opening being shaped and disposed to cooperate with the annular opening in the valve body in the assembled position of the stem-engaging element to define the valve body control passageway.

23. The valve assembly of claim 22 wherein the stem-engaging element is further defined to include; an annular groove formed about a portion of the outer periphery thereof, the annular groove being shaped and disposed to cooperate with an adjacent portion of the valve body in the assembled position of the stem-engaging element to define a seat opening in the valve body, another annular groove formed about a portion of the stem-engaging element generally adjacent and intersecting a portion of the stem aperture, and a transverse opening formed in a portion of the stem-engaging element being shaped and disposed such that a portion thereof intersects a portion of the seat opening and another portion thereof intersects a portion of the annular groove about the stem aperture, the transverse aperture, the seat opening and the annular groove about the stem aperture, defining the opening in the stem-engaging element.

24. The valve member of claim 21 wherein the upper valve stem includes a chamber formed in the upper portion, a downstream aperture formed in the lower portion thereof, the downstream aperture intersecting the chamber in the upper valve stem, the downstream aperture and the chamber in the upper valve stem defining a portion of the valve stem control passageway, and the downstream aperture being disposed such that the downstream aperture in the upper valve stem communicates with the downstream valve member control passageway in the valve member; and wherein the valve member assembly is defined further to include:

a downstream ball check disposed in the chamber in the valve stem and being shaped to seatingly and sealingly engage an adjacent portion of the upper valve stem around the downstream aperture in a seating position thereof, the downstream ball check being disposed and adapted such that fluid flowing from the downstream aperture in the upper valve stem into the chamber moves the downstream ball check to a nonseating position and to seatingly and sealingly engage a portion of the upper valve stem to prevent the flow of fluid from the chamber toward the downstream aperture in the upper valve stem.

25. The valve assembly of claim 2 wherein the upstream seat assembly is further defined as being rotatably disposed in the bore of the valve body and adapted such that fluid via the valve body control passageway rotates the upstream seat assembly as the upstream seat assembly slidably moves toward a nonseating position in the valve body.

26. The valve assembly of claim 25 wherein the upstream seat assembly is further defined to include a plurality of ratchet teeth formed annularly about a portion thereof; and wherein the valve assembly is defined further to include: a pawl means rotatably disposed in the valve body having one end thereof shaped and disposed to engage a portion of the rachet teeth about the upstream seat assembly in an engaging position thereof, and being adapted to limit the rotational movement of the upstream seat assembly to one direction in an engaging position of the pawl means; and a spring means disposed in a portion of the valve body, the spring means being shaped and adapted to engage a portion of the pawl means and to bias the pawl means toward an engaging position.

27. The valve assembly of claim 2 wherein the upstream seat assembly includes, a valve member end and a nonvalve member end, the seating surface being formed on a portion of the valve member end thereof, the upstream seat assembly being disposed in the valve body and shaped such that fluid in the upstream end of the valve body acts upon a portion of the nonvalve member end of the upstream seat assembly, thereby biasing the upstream seat assembly generally toward a seating position in the valve body.

28. The valve assembly of claim 2 defined further to include:
an elastomeric seal member disposed on a portion of the outer surface of the valve member, a portion of the elastomeric seal member being sized and disposed to sealingly engage the seating surface of the upstream seat assembly in a seating position of the upstream seat assembly.

29. The valve assembly of claim 28 wherein the valve member is further defined as being spherically shaped and having a flow port formed therethrough.

30. The valve assembly of claim 28 wherein the portion of the upstream seat assembly forming the seating surface thereon is further defined as being constructed of a metal.

31. The valve assembly of claim 28 wherein the portion of the upstream seat assembly forming the seating surface thereon is further defined as being constructed of a reenforced, elastomeric material.

* * * * *